United States Patent
Mukherji

(10) Patent No.: US 9,757,688 B2
(45) Date of Patent: Sep. 12, 2017

(54) SYSTEMS AND METHODS OF CAPTURING CARBON DIOXIDE AND MINIMIZING PRODUCTION OF CARBON DIOXIDE

(71) Applicant: Sidel Systems USA Inc., Atascadero, CA (US)

(72) Inventor: Parthosarothy K. Mukherji, Pune (IN)

(73) Assignee: Sidel Systems USA Inc., Atascadero, CA (US)

( * ) Notice: Subject to any disclaimer, the term of this patent is extended or adjusted under 35 U.S.C. 154(b) by 0 days.

(21) Appl. No.: 14/641,255

(22) Filed: Mar. 6, 2015

(65) Prior Publication Data

US 2015/0251135 A1    Sep. 10, 2015

Related U.S. Application Data

(60) Provisional application No. 62/084,823, filed on Nov. 26, 2014, provisional application No. 61/949,279, filed on Mar. 7, 2014.

(51) Int. Cl.

| | |
|---|---|
| *B01D 53/62* | (2006.01) |
| *F23J 15/02* | (2006.01) |
| *B01D 53/14* | (2006.01) |
| *F23J 15/04* | (2006.01) |

(52) U.S. Cl.
CPC ......... *B01D 53/62* (2013.01); *B01D 53/1475* (2013.01); *B01D 53/1493* (2013.01); *F23J 15/04* (2013.01); *B01D 2251/404* (2013.01); *B01D 2251/602* (2013.01); *B01D 2251/606* (2013.01); *B01D 2252/205* (2013.01); *F23J 2215/50* (2013.01); *F23J 2219/40* (2013.01); *Y02C 10/04* (2013.01); *Y02C 10/06* (2013.01); *Y02E 20/326* (2013.01)

(58) Field of Classification Search
CPC ..................................................... B01D 53/62
See application file for complete search history.

(56) References Cited

U.S. PATENT DOCUMENTS

| | | |
|---|---|---|
| 1,578,463 A | 3/1926 | Nicholson et al. |
| 1,815,276 A | 7/1931 | Schwieger |
| 2,164,186 A | 6/1939 | Brown et al. |
| 2,547,298 A | 4/1951 | Wiklund |
| 2,557,800 A | 6/1951 | Seailles |
| 2,697,049 A | 12/1954 | Brieghel-Muller |
| 2,774,693 A | 12/1956 | Brieghel-Muller |
| 2,801,940 A | 8/1957 | Stark et al. |

(Continued)

*Primary Examiner* — Douglas B Call
(74) *Attorney, Agent, or Firm* — Doherty IP Law Group LLC

(57) ABSTRACT

A method of capturing carbon dioxide emitted by a power plant includes providing a reactor vessel having a shell with a top and a bottom, introducing an exhaust gas stream into the reactor vessel, the exhaust gas stream containing carbon dioxide, whereby the exhaust gas stream rises toward the top of the reactor vessel. The method includes introducing an organic sorbent solution into the reactor vessel near the top of the reactor vessel so that the organic sorbent solution falls toward the bottom of the reactor vessel, mixing the rising exhaust gas stream with the falling organic sorbent solution to precipitate calcium carbonate, and removing the calcium carbonate from the bottom of the reactor vessel, whereby the calcium carbonate includes the carbon dioxide from the exhaust gas stream.

23 Claims, 13 Drawing Sheets

(56) References Cited

U.S. PATENT DOCUMENTS

| | | | |
|---|---|---|---|
| 2,824,028 A | | 2/1958 | Zenzes |
| 2,977,253 A | | 3/1961 | Grandadam |
| 3,089,789 A | | 5/1963 | Van Note |
| 3,113,044 A | | 12/1963 | Alston |
| 3,168,419 A | | 2/1965 | Gale |
| 3,212,857 A | | 10/1965 | Heinrich |
| 3,734,773 A | | 5/1973 | Haley |
| 4,328,043 A | | 5/1982 | Freytag et al. |
| 4,432,806 A | | 2/1984 | Madsen et al. |
| 5,320,681 A | | 6/1994 | Moc et al. |
| 5,480,490 A | | 1/1996 | Toth et al. |
| 5,554,227 A | | 9/1996 | Kwok et al. |
| 6,176,935 B1 | * | 1/2001 | Brahmbhatt ............ C13B 20/06 127/12 |

* cited by examiner

SYSTEMS AND METHODS OF CAPTURING CARBON DIOXIDE AND MINIMIZING PRODUCTION OF CARBON DIOXIDE

CROSS-REFERENCE TO RELATED PATENT APPLICATIONS

The present patent application claims benefit of U.S. Provisional Application No. 62/084,823, filed Nov. 26, 2014, and U.S. Provisional Application No. 61/949,279, filed Mar. 7, 2014, the disclosures of which are hereby incorporated by reference herein.

BACKGROUND OF THE INVENTION

Field of the Invention

The present patent application is directed to minimizing carbon dioxide emissions and is more particularly directed to systems and methods for capturing carbon dioxide and minimizing carbon dioxide production of carbon dioxide.

Description of the Related Art

Coal Fired Power Plants (CFPP) and natural gas power plants generate carbon dioxide ($CO_2$) emissions that must be controlled and captured. Conventional carbon capture sequestration technologies are generally effective, however, they are energy intensive, involve high capital costs, and require sophisticated processes.

Many industries typically use $CO_2$ as part of a manufacturing or production process. The production of $CO_2$ for industrial use requires money and energy, and it also creates its own $CO_2$ emission concerns.

Thus, there is a need for systems and methods that combine the needs of power plants to reduce $CO_2$ emissions and industries to not unnecessarily produce excess amounts of $CO_2$. There also remains a need for carbon capture technologies and systems that are economically attractive regardless of new legislative requirements, creating a powerful incentive for the operators of CFPPs to embrace and adapt carbon capture technology.

SUMMARY OF THE INVENTION

While the current Carbon Capture Sequestration technologies are a valuable and viable part of the solution, they are also very energy intensive, involve high capital cost and require sophisticated processes.

The present application discloses a carbon capture unit and a carbon capture system that is simple, cost-effective, energy efficient and scalable.

In one embodiment, the carbon capture unit uses amines from sugar beet juice and quick liming to capture $CO_2$ and develop byproducts that can generate revenue and/or reduce the cost of operating the power plant. This technology will allow coal-fired power plants ("CFPPs") to reduce $CO_2$ emissions, meet EPA requirements, and continue profitable operations. The carbon capture technology disclosed herein will preserve existing jobs and by virtue of its method, create new jobs and local economic growth.

The system disclosed herein both captures carbon dioxide efficiently and generates fungible by-products.

The present invention provides a system that minimizes energy penalty and carbon footprint during sorbent regeneration, and implements a process in CFPPs with lower capital and operational costs.

The present invention provides a ready source of amine solution, regenerates quick lime sorbent with minimal energy penalty and carbon footprint, establishes quantifiable results, standardizes the process and creates multiple by-products with economic benefits that incentivize CFPPs to buy into this technology. The carbon capture system discloses herein is provided in a standard package, is compatible with existing processes and infrastructure, is scalable, and is available at reasonable capital costs.

A standard practice in the global sugar refining industry is the process of making refined sugar from sugar beet or sugar cane juice by carbonation. The juice is an organic amine by definition with an amine content that aids absorption. The process is relatively inexpensive, uses no expensive materials or sophisticated technologies, and is an established standardized process that is scalable. The process also uses liming.

The present invention adapts this carbonation process from the sugar beet refining industry to the energy industry, thereby offering American CFPPs a cost effective solution to reduce $CO_2$ output to well within EPA requirements.

The carbon capture system disclosed herein captures the maximum amount of carbon dioxide per kg sorbent, regenerates sorbent with almost a zero carbon footprint, has the least energy penalty compared to current comparable technologies, and has the lowest capital cost compared to other carbon capture technologies.

The technology is adaptable to both large and small industries, and both CFPPs and natural gas fired plants.

Sugar beet juice has non-sugars to which carbon dioxide adheres/bonds and forms an agglomeration, which when subjected to the precipitation action of calcium carbonate, formed by adding lime, causes the whole agglomeration to separate out of the liquid.

The sugar beet juice in its raw, unpurified and unfiltered form, which the present invention uses, also has suspended solids, such as vegetal matter that acts as a type of sponge, holding the carbon dioxide bubbled through it, increasing the residence time of the $CO_2$ in solution and increasing the efficacy of the reaction with lime.

Organic amines, which are a constituent of the sugar beet juice, further enhance the $CO_2$ absorption process.

Refining sugar from sugar beets includes the following steps: 1) Slicing of raw beets to produce cossettes; 2) Placing the cossettes in hot water to extract the sugar-containing juices so that a "raw juice product" is produced; 3) Carbonation of the juice product with $CO_2$; and 4) Allowing the treated juice product to settle.

After being harvested, beets are typically transported to a factory by truck or rail. Each load is weighed and sampled before it gets tipped onto the reception area, typically a "flat pad" of concrete, where it is moved into large heaps. The beet sample is checked for 1) soil tare—the amount of non-beet delivered, 2) crown tare—the amount of low-sugar beet delivered, 3) sugar content ("pol")—amount of sucrose in the crop, and 4) nitrogen content—for recommending future fertilizer use to the farmer. From these elements, the actual sugar content of the load is calculated and the grower's payment determined. The beet is moved from the heaps into a central channel or gulley, where it is washed and advanced toward the processing plant.

After reception at the processing plant, the beet roots are washed, mechanically sliced into thin strips called cossettes, and passed to a machine called a diffuser to extract the sugar content into a water solution. Since the beets (water content ca. 75%) carry sufficient water which accumulates as condensate, a factory does not generally require ground or surface water for the process. Diffusers are long vessels of many meters in which the beet slices go in one direction while hot water goes in the opposite direction. The movement may either be caused by a rotating screw or the whole rotating unit, and the water and cossettes move through internal chambers. Typically, cossettes take about 90 minutes to pass through the diffuser, the water only 45 minutes. These countercurrent exchange methods extract more sugar from the cossettes using less water than if they merely sat in a hot water tank. The liquid exiting the diffuser is called raw juice.

The used cossettes, or pulp, exit the diffuser at about 95% moisture, but low sucrose content. Using screw presses, the wet pulp is then pressed down to 75% moisture. This recovers additional sucrose in the liquid pressed out of the pulp, and reduces the energy needed to dry the pulp. The pressed pulp is dried and sold as animal feed, while the liquid pressed out of the pulp is combined with the raw juice, or more often introduced into the diffuser at the appropriate point in the countercurrent process. The final byproduct, vinasse, is used as fertilizer or growth substrate for yeast cultures.

Carbonation is a procedure which removes impurities from raw juice before it undergoes crystallization. First, the juice is mixed with hot milk of lime (a suspension of calcium hydroxide in water). This treatment precipitates a number of impurities, including multivalent anions such as sulfate, phosphate, citrate and oxalate, which precipitate as their calcium salts and large organic molecules such as proteins, saponins and pectins, which aggregate in the presence of multivalent cations. In addition, the alkaline conditions convert the simple sugars, glucose and fructose, along with the amino acid glutamine, to chemically stable carboxylic acids. Left untreated, these sugars and amines would eventually frustrate crystallization of the sucrose.

Next, carbon dioxide is bubbled through the alkaline sugar solution, precipitating the lime as calcium carbonate. The chalk particles entrap some impurities and absorb others. A recycling process builds up the size of chalk particles and a natural flocculation occurs where the heavy particles settle out in tanks (clarifiers). A final addition of more carbon dioxide precipitates more calcium from solution; this is filtered off, leaving a cleaner, golden light-brown sugar solution called thin juice.

The thin juice is concentrated via multiple-effect evaporation to make a thick juice, roughly 60% sucrose by weight and similar in appearance to pancake syrup. Thick juice can be stored in tanks for later processing, reducing the load on the crystallization plant.

Thick juice is fed to the crystallizers. Recycled sugar is dissolved into it, and the resulting syrup is called mother liquor. The liquor is concentrated further by boiling under a vacuum in large vessels (the so-called vacuum pans) and seeded with fine sugar crystals. These crystals grow as sugar from the mother liquor forms around them. The resulting sugar crystal and syrup mix is called a massecuite, from "cooked mass" in French. The massecuite is passed to a centrifuge, where the High Green syrup is removed from the massecuite by centrifugal force. After a predetermined time, water is then sprayed into the centrifuge via a spray bar to wash the sugar crystals which produces Low Green syrup. The centrifuge then spins at very high speed to partially dry the crystals the machine then slows down and a plough shaped arm is deployed which ploughs out the sugar from the sides of the centrifuge from the top to the bottom onto conveying plant underneath where it is transported into a rotating granulator where it is dried using warm air.

The high green syrup is fed to a raw sugar vacuum pan from which a second batch of sugar is produced. This sugar ("raw") is of lower quality with more color and impurities, and is the main source of the sugar dissolved again into the mother liquor. The syrup from the raw (Low green syrup) is boiled for a long time in AP Pans and sent to slowly flow around a series of about eight crystallizers. From this, a very low-quality sugar crystal is produced (known in some systems as "AP sugar") that is also re-dissolved. The syrup separated is molasses, which still contains sugar, but contains too much impurity to undergo further processing economically. The molasses is stored on site and is added to dried beet pulp to make animal feed. Some is also sold in bulk tankers.

Juice Purification. The main purpose of juice purification is to remove the non-sugar substances contained in the raw juice and, thus, increase the ratio of sucrose to total solids content (i.e., the purity of the juice) as much as possible. Classical juice purification consists of bubbling carbon dioxide through the raw juice from sugar beets or sugar cane. The carbon dioxide adheres to and combines with the non-sugars in the juice. Adding lime causes the formation of calcium carbonate which precipitates out of the solution as a sludge along with the non-sugars, leaving a sugar-rich solution which can be easily processed into molasses, bio-fuel raw stock or alcohol.

Quicklime (CaO) is the cheapest precipitation agent, and has been used for more than 100 years in the sugar industry.

In conventional methods, the carbonated beet juice and calcium carbonate precipitate travel from the collection tank to the thickener or mud-settling tank where the two juices (clarified and muddy) are separated, then fed into the second carbonation tank. Once the second carbonation is complete (e.g., pH=8.7 to 8.8 at 208° F. or 98° C.), the juice goes to a collection tank and is then again filtered. In contrast, in the present invention, the carbonated beet juice and calcium carbonate precipitate do not travel from the collection tank to a thickener or mud settling tank. Instead the calcium carbonate precipitate separates out as sludge from the reactor into a collecting trough below the reactor, and the remaining carbonated juice, rich in sugars and organic components, is piped to a storage tank. The end result will cause the calcium carbonate precipitate to be separated from the purified beet juice product. The purified beet juice product can then be further treated to convert it into either stock for bio fuel or into ethanol In one embodiment, a carbon capture system utilizes a single reactor vessel, vertical in orientation, cylindrical in shape, with hemispherical dish ends. An organic absorbent solution is brought from a storage container to the reactor by gravitational feed. Inside the reactor vessel, a sparger is placed with suitably sized and configured nozzles that spray the organic fluid into the inner volume of the vessel.

In one embodiment, collection trays, such as collection trays with serrated edges, are placed within the reactor vessel. The descending organic absorbent fluid collects in the trays, and when this overflowing fluid passes over the serrated edges, they separate the overflowing fluid into sheet-like films. The bottoms of the trays have multiple small apertures which allow the fluid collected in each tray to again pour out of the tray from under the surface in the form of thin streams. When the weight of precipitated calcium carbonate that is collected on the tray exceeds the weight of a counterweight coupled with the tray, the tray swivels and dumps the calcium carbonate to the bottom of the reactor vessel. A conical collector or one or more calcium carbonate sieves are placed at the bottom of the reactor vessel, which receive the dumped calcium carbonate and via an exit sump discharges it into receiving equipment such as a conveyer belt or receiving bin.

At a level of the reactor vessel above where the bottom end meets the cylindrical body of the reactor, inlet nozzles are circumferentially arranged around the body of the shell. These inlet nozzles connect to the pipe which will bring the $CO_2$ or flue gas from a CFPP or natural gas power plant into the reactor. In one embodiment, the inlet nozzles may project inwardly to create an upward flow of the flue gas to create turbulent mixing with the descending fluid streams.

The top of the reactor vessel preferably has one or more vents to allow escape of the remaining vented gases, which do not include $CO_2$.

In one embodiment, the bottom of the reactor vessel preferably includes a drain so that unreacted absorbent fluid may be collected and re-circulated back into reactor vessel.

The shell of the reactor vessel preferably has orifices for temperature measurement, gas flow measurement, pressure measurement and sampling tubes.

In one embodiment of the present invention, a method of capturing carbon dioxide emitted by a power plant preferably includes providing a reactor vessel having a shell with a top and a bottom, introducing an exhaust gas stream into the reactor vessel, the exhaust gas stream containing carbon dioxide, whereby the exhaust gas stream rises toward the top of the reactor vessel, introducing an organic sorbent solution into the reactor vessel near the top of the reactor vessel so that the organic sorbent solution falls toward the bottom of the reactor vessel, mixing the rising exhaust gas stream with the falling organic sorbent solution to precipitate calcium carbonate, and removing the calcium carbonate from the bottom of the reactor vessel, the calcium carbonate including the carbon dioxide from the exhaust gas stream.

In one embodiment, the organic sorbent solution preferably includes raw sugar beet juice and lime milk. The mixing step desirably includes precipitating a sugar rich solution from the raw sugar beet juice. In one embodiment, the sugar rich solution is separated from the calcium carbonate and the sugar rich solution is removed from the reactor vessel. In one embodiment, moisture is removed from the sugar rich solution to generate crystallized sugar.

In one embodiment, after the mixing step, the exhaust gas stream is removed from the top of the reactor vessel. The exhaust gas stream removed from the top of the reactor vessel preferably has less carbon dioxide than the exhaust gas stream introduced into the reactor vessel.

In one embodiment, the exhaust gas stream is introduced into the reactor vessel by burning a fuel at a power plant to generate energy and the exhaust gas stream, using a conduit to connect the reactor vessel with the power plant, and directing the exhaust gas stream through the conduit and into the reactor vessel. In one embodiment, the power plant is a coal fired power plant or a natural gas power plant.

In one embodiment, the calcium carbonate removed from the reactor vessel is burned to generate energy.

In one embodiment, a method of making sugar using carbon dioxide gas emitted by a power plant preferably includes processing sugar beets to generate raw sugar beet juice, and mixing the raw sugar beet juice with lime milk to product a sorbent solution. The method preferably includes providing a reactor vessel having a shell with a top and a bottom, introducing an exhaust gas stream from a power plant into the reactor vessel, the exhaust gas stream containing carbon dioxide, whereby the exhaust gas stream rises toward the top of the reactor vessel. The method desirably includes introducing the sorbent solution containing the raw sugar beet juice and the lime milk into the reactor vessel near the top of the reactor vessel so that the sorbent solution falls toward the bottom of the reactor vessel, mixing the rising exhaust gas stream with the falling sorbent solution to precipitate calcium carbonate that contains the carbon dioxide from the exhaust gas stream and a sugar rich solution derived from the raw sugar beet juice, separating the sugar rich solution from the calcium carbonate, and removing the calcium carbonate from the bottom of the reactor vessel In one embodiment, Cao (lime) is the primary sorbent upon which the entire carbon dioxide removal mass balance equations are calculated. CFPPs already procure substantial quantities of lime for their sulfur scrubbing stations and the byproduct, calcium sulfate, is sold to cement manufacturing plants as a raw material. Regeneration of lime in lime kilns is a long established and standardized process, but the use of fossil fuels for the process typically involves a carbon penalty.

The present invention overcomes the deficiencies found in conventional systems by making it possible to substitute some of the fossil fuel with a green fuel, thereby providing no carbon penalty. In one embodiment, the green fuel is molasses, which is a byproduct of the carbon capture process. Molasses has been used as a fuel in boilers and furnaces, and is currently being used as a fuel for power generation.

Molasses has historically been used as a fuel to fire the boilers and generate process steam, primarily in the global sugar industry, when there were shortages of coal or fuel oil. After World War II, its use as a fuel decreased due to the abundant availability of reasonably-priced fuel oil. Later, the use of molasses as a fuel declined further when it became attractive as a feedstock for ethanol production.

However, the use of molasses as a fuel in modern power plants, rather than as a feedstock for alcohol production, increased in countries such as Brazil which have an abundant source of raw juice (from sugar cane or sugar beets). Molasses has the clear potential to be used in modern power plants as the primary/supplemental or even sole fuel due to many attractive aspects:

First, Molasses is cheap to produce, being essentially the thickened leftover syrup after sugar is extracted. Its calorific value depends on the sugar content left in the syrup and the LCV after full recovery of sugars is 7-10 MJ/Kg. It has a viscosity at 100° C./15-40 cSt.

Burners designed to combust molasses also combust HFO, animal fat, soya bean oil and other bio-origin oils. In addition, the ash content of molasses is 10% maximum and it has no significant sulfur compared to coal. Hence, there is minimal SOX. Molasses can also be stored for long periods using accepted procedures.

Combustion of molasses and vinasse is a classic win-win situation. Even though the application requires high-tech equipment and precise adaptation to the individual plan, it permits enormous cost savings because over 70% of the fossil fuel is replaced. Furthermore, the environment profits again as valuable fertilizer is created.

Molasses is considered a low heating value fuel 7-10 MJ/Kg because of its high water content (up to 50%) and the exhaustion of the sugar which deplete the hydrogen content. However, when used as a fuel, molasses has been used dried and that greatly enhances its viability as a fuel.

In one embodiment, the sugars are not recovered and hence the calorific value further improves. Drying of the molasses is achieved by using the recovered waste heat from the flue gasses.

Further references to Molasses as being combined with fuel oil and also used as a fuel preparation agent to prevent coal absorbing moisture, are cited in the citations section.

In one embodiment, flue gas from a power plant enters a particulate separator and exits at a temperature of 150-200 degrees Celsius. The flue gas then enters a flue gas condenser where the heat energy is recovered to be utilized for another application. The flue gas then enters the carbon capture reactor for $CO_2$ transformation $$Ca(OH)_2 + CO_2 \rightarrow CaCO_3 + H_2O$$

The above-described reaction does not require any additional heat input externally. At this stage of the process, the energy inputs are mainly the pumping power consumption for circulation and recirculation of the juice. The calcium carbonate is precipitated out of the solution and conveyed to storage. The raw bio fuel stock, (e.g., juice with non-sugars removed), is piped to storage tanks. At this stage of the process the only energy inputs are those required by the conveying/pumping equipments and no heat input is required. Calcium carbonate is regenerated in the lime kiln using molasses as fuel. The waste heat from the lime kiln due to fuel combustion and the exothermic reaction of CaO being added to water is used to thicken the sugar rich juice to molasses. This is usually the most energy intensive phase of conventional sorbent based processes because the sorbent regeneration requires high temperatures and power penalty. In the process disclosed herein, however, the energy requirement is met by the combustion of molasses which has been generated as a by-product without energy penalty and has its calorific value increased by waste heat.

The CaO regeneration is phased so as to liberate the $CO_2$ converted to $CaCO_3$ at the convenience of the CFPP. In one embodiment, the recovered heat energy and recovered $CO_2$ is piped into greenhouses and algae ponds for use by the plants.

In conventional carbon capture systems, this phase is very energy intensive because the $CO_2$ has to be compressed and piped away.

At each stage of the present invention, the pressures involved have all been slightly above atmospheric and the temperatures, except at the limekiln combustion chamber, moderate.

The heat from the lime kiln and the lime regeneration are recovered and used to enhance the calorific value of the bio fuel (by drying) so a heat balance is achieved.

In the present invention, the energy requirements are met by the combustion of molasses, which has been generated as a by-product without energy penalty and has its calorific value increased by waste heat.

Energy Debits. Applying the Energy/Exergy analysis methodology outlined before the tabulation of the steps, the energy credits and debits are as follows:

Taking the difference between the transportation and compression energy and the total energy consumption in processes with amine scrubbing (which is the correct basis for comparison), the actual power consumed for the present invention versus a conventional sorbent based process is in the range of 0.04 KWh/Kg $CO_2$ captured and Heat consumption 2,000 KJ/Kg CO2 and an energy penalty of not more than 5%.

| ENERGY REQUIREMENTS FOR CAPTURE KWH/kG | GULF/SIDEL | NGCC | PC | IGCC |
|---|---|---|---|---|
| | 0.16 | 0.354 | 0.317 | 0.194 |

The above table shows representative costs for a supercritical (SC) PC power plant, with and without capture based on a modern amine system. Note that the costs include both capture and compression, but exclude transport and storage.

Current state-of-the-art supercritical plants operate at 24.3 MPa (3530 psi) and 565 C (1050 F). The primary use is to illustrate the relative costs of power with and without $CO_2$ capture.

The first thing to note is that when a capture and compression system is added, a power plant's overall thermal efficiency (the fraction of the energy released by combustion of the fuel that is transformed into electricity) drops from 38.5% to 29.3% (a relative decrease of 24%). This is caused by the additional parasitic energy load from the CO2 capture system. The parasitic load can be broken down into three components: 1) Extraction of steam from the plant's electricity-generating turbine to the stripper Reboiler—accounts for over 60%. The steam provides energy to break the chemical bonds between the $CO_2$ and the amine; provides heat required to raise the temperature of the amine solution to the operating temperature of the stripper, and sweep away the released $CO_2$; 2) Electricity to drive the $CO_2$ compressors accounts for about a third; and 3) Electricity to drive the blowers to push the flue gas through the absorber accounts for about 5%.

The drop in thermal efficiency with capture has multiple effects on plant cost. First, 30% more coal must be burned to produce the same amount of electricity.

More importantly, as indicated in the above table, the capital cost of the plant in $/kW increases by 61%. This is because capital investment increases by 22% or a factor of 1.22 (to pay for the amine absorption process, compressors, etc.), while electrical output decreases by 24% or a factor of 0.76. Thus, the investment cost expressed in $/kW increases by a factor of 1.22/0.76 or 1.61.

In other words, parasitic energy drain translates into the consumption of more coal per kWh and an increase in plant capital beyond the purchase price of additional equipment. Because of the magnitude of this effect, a key goal in post-combustion capture is to reduce the parasitic energy load.

The carbon capture system disclosed herein uses carbonation process that has been used in the sugar industry for decades. The process has been transformed so that it can be used in CFPPs.

The process is scalable and levels of carbon dioxide emissions typical of CFPPs can be trapped and converted to useful by products.

The sorbents used in the process are tried and proven and the limitations in earlier approaches to the sorbent regeneration are addressed The energy penalty, capital cost, mitigation cost, and operational cost are the lowest of all existing technologies. These are:

| | |
|---|---|
| Capital $/MWh | 40 |
| Fuel $/MWh | 16 |
| O &M $/MWh | 7 |
| Total $/MWh | 63 |
| $Tonne CO2 avoided | 43.32 |

The raw materials to be procured for the process are readily available and the sugar beet juice can be derived from inexpensive waste products cut from sugar beets that are often discarded by the sugar industry.

In the case of the primary sorbent (CaO), it is already procured by CFPPs for their sulfur scrubbers.

The process is flexible in the sense that it can operate even if raw material sources dry up. The CaO is regenerated continuously and the molasses biofuel is storable for extended periods without detritions. In the absence of beet sugar juice, water can be used in the reactor along with liming. Biofuels will not be created as a by-product if water is used, but CaCO3 will still be produced.

No drastic changes to existing CFPPs layouts/processes or manpower requirements are required. It is compatible with, and can be retrofitted to, the existing coal-fired power plant infrastructure without requiring substantial change in basic combustion technology.

CFPP's using the carbon capture system disclosed herein can cost-effectively meet EPA regulations for controlling $CO_2$ emissions. The system may also be used for capturing $CO_2$ in natural gas-fired power plants.

If the carbon capture system disclosed herein has to shut down for some reason, the power plant can still function normally. The carbon capture unit disclosed herein can be installed and maintained without requiring power plant shutdowns.

These and other preferred embodiments of the present invention will be described in more detail below.

DETAILED DESCRIPTION

Figure 1A:
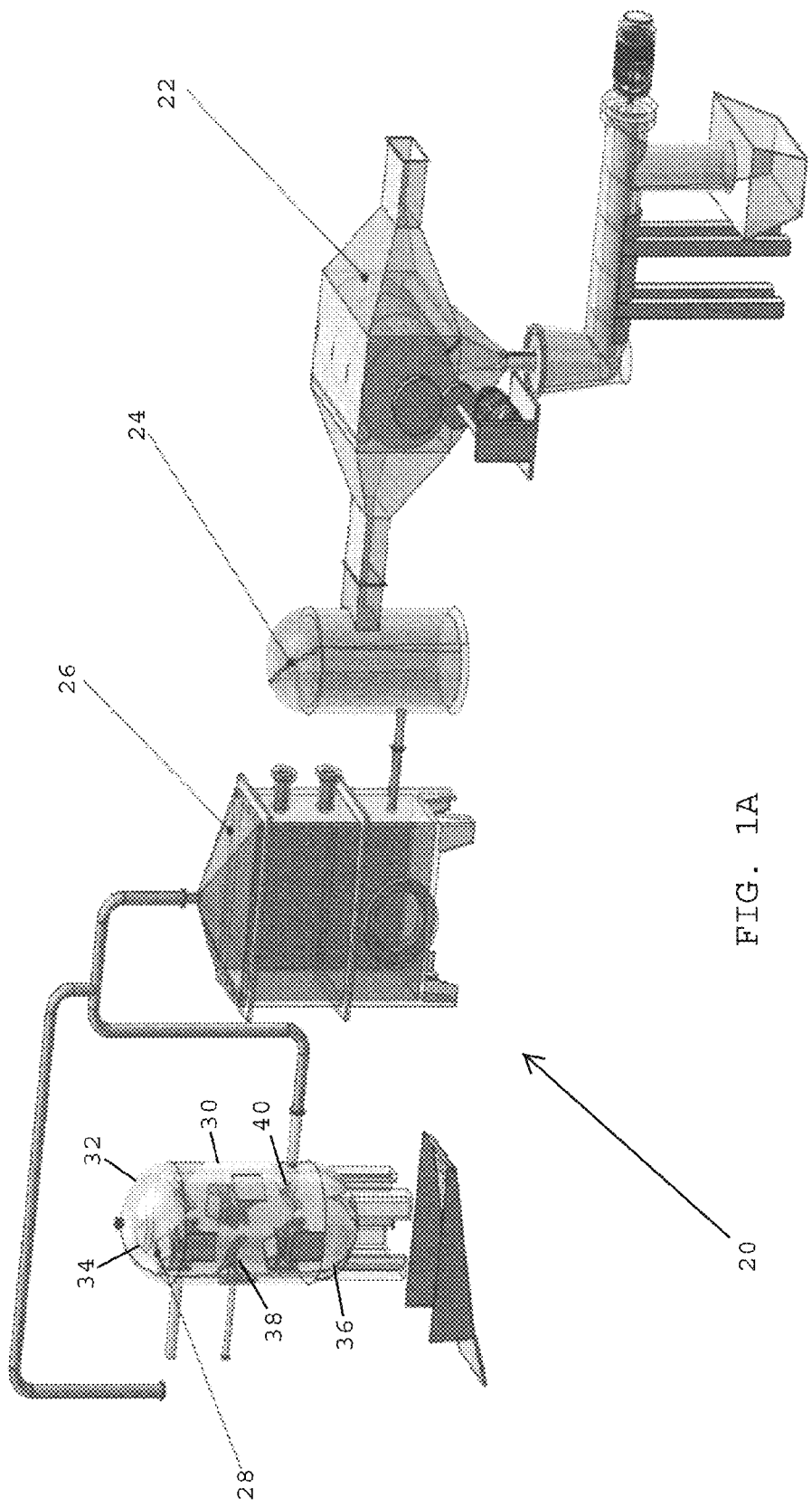
FIG. 1A shows a perspective view of an exhaust gas treatment system including a carbon capture unit having a shell, a top, a bottom, a tray assembly having a tray, and a calcium carbonate sieve, in accordance with one embodiment of the present invention.
Figure 1B:
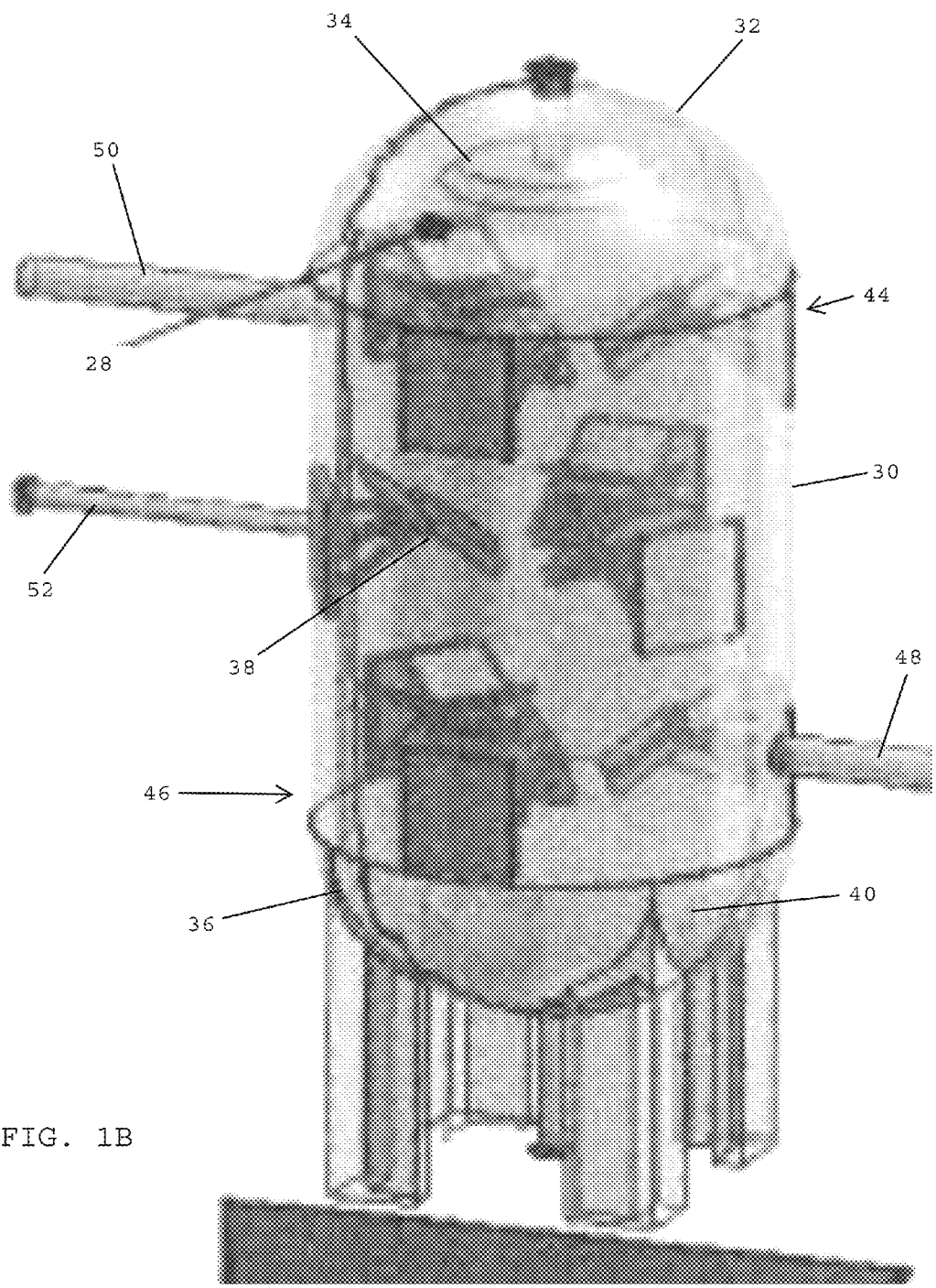
FIG. 1B shows a perspective view of the carbon capture unit shown in FIG. 1A.

Referring to FIGS. 1A and 1B, in one embodiment, an exhaust gas treatment system 20 is preferably adapted to receive and treat exhaust gases from a power plant such as a coal burning power plant that produces electricity. In one embodiment, the exhaust gas treatment system 20 preferably includes a particulate recovery system 22 that removes particulate material (e.g., ash) from an exhaust gas, a sulfur gas recovery unit 24 that removes sulfur from the exhaust gas stream, a heat recovery unit 26 that removes heat energy from the exhaust gas stream, and a carbon capture unit 28 that remove carbon dioxide from the exhaust gas stream.

In one embodiment, the carbon capture unit 28 preferably includes a shell 30, a top 32, a sparger 34 located inside the top, a bottom 36, one or more tray assemblies 38, and one or more calcium carbonate sieves 40 located near a lower end of the shell 30. As will be described in more detail herein, the carbon capture unit 28 uses sugar beet juice and lime milk to remove carbon dioxide from the exhaust gas stream of a power plant such as a coal fired power plant.

Figure 2A:
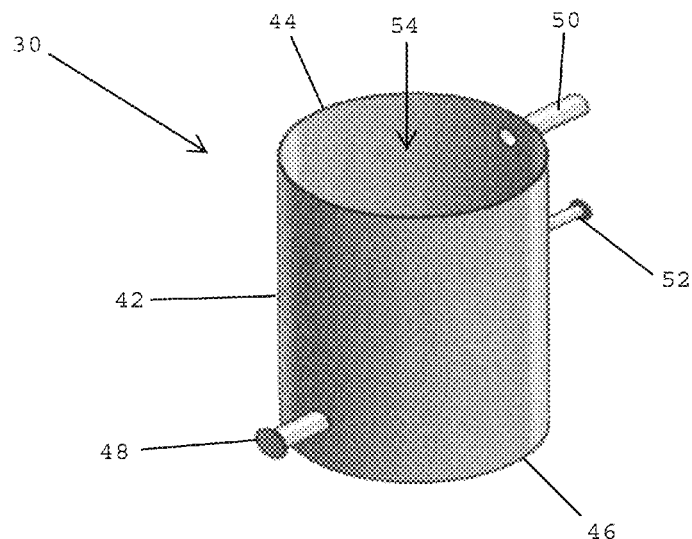
FIGS. 2A-2C show the shell of the carbon capture unit shown in FIG. 1A.
Figure 2B:
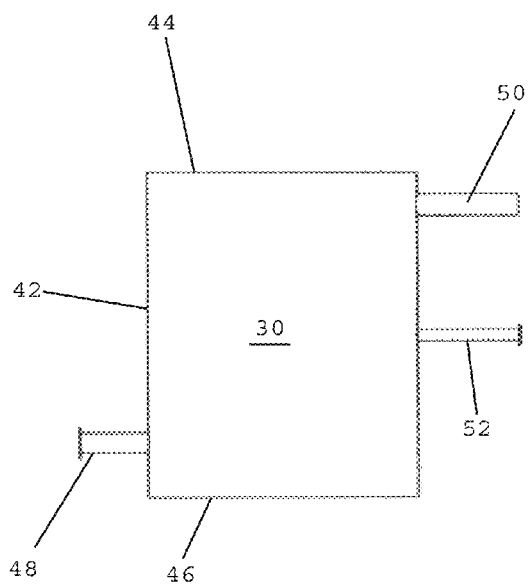
Figure 2C:
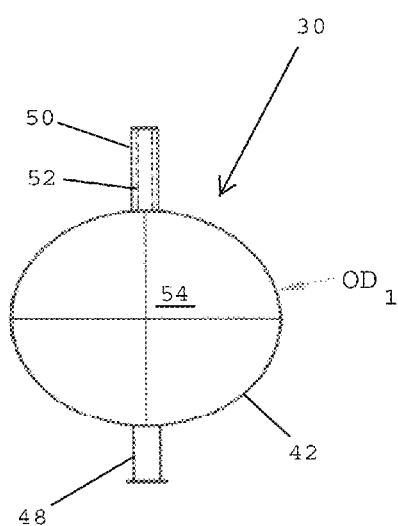

Referring to FIGS. 1B and 2A-2C, in one embodiment the shell 30 has a cylindrical-shaped side wall 42 having an upper end 44 and a lower end 46. The shell 30 is preferably made of stainless steel. In one embodiment, the side wall 42 has as outer diameter $OD_1$ of about 4,000 cm (FIG. 2C). The shell desirably includes an exhaust gas stream inlet 48 located adjacent the lower end 46 of the side wall 42, a reacted gas outlet 50 located adjacent the upper end 44 of the side wall 42, and a raw juice inlet 52 located above the exhaust gas stream inlet 48 and below the reacted gas outlet 50.

The side wall 42 of the shell 30 surrounds a reaction chamber 54 in which a reaction takes place among an exhaust gas stream containing carbon dioxide, lime milk, and raw sugar beet juice to, inter alia, capture carbon dioxide present in the exhaust gas stream. The exhaust gas stream containing the carbon dioxide rises inside the reaction chamber and the raw sugar beet juice is introduced at the top and moves down within the reaction chamber. After the reaction takes place, reacted gas minus the carbon dioxide that has been removed is discharged from the shell 30 via the reacted gas outlet. The reaction creates calcium carbonate sludge that contains the extracted carbon dioxide. The calcium carbonate sludge is removed from the carbon capture unit 28 via the bottom 36 of the unit.

Figure 3A:
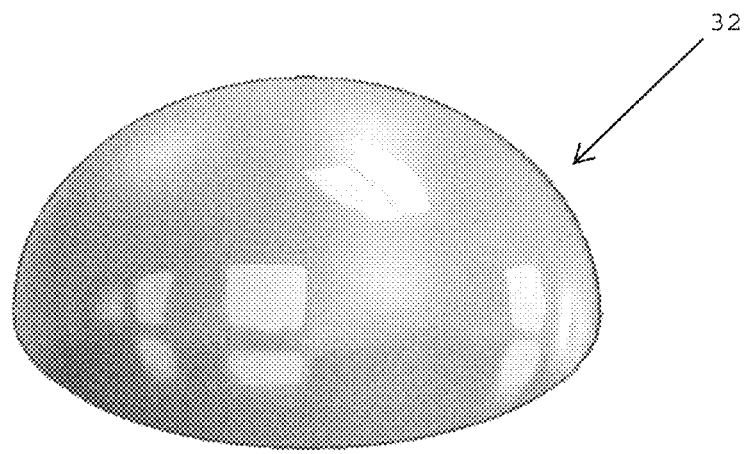
FIGS. 3A-3C show the top of the carbon capture unit shown in FIG. 1A.
Figure 3B:
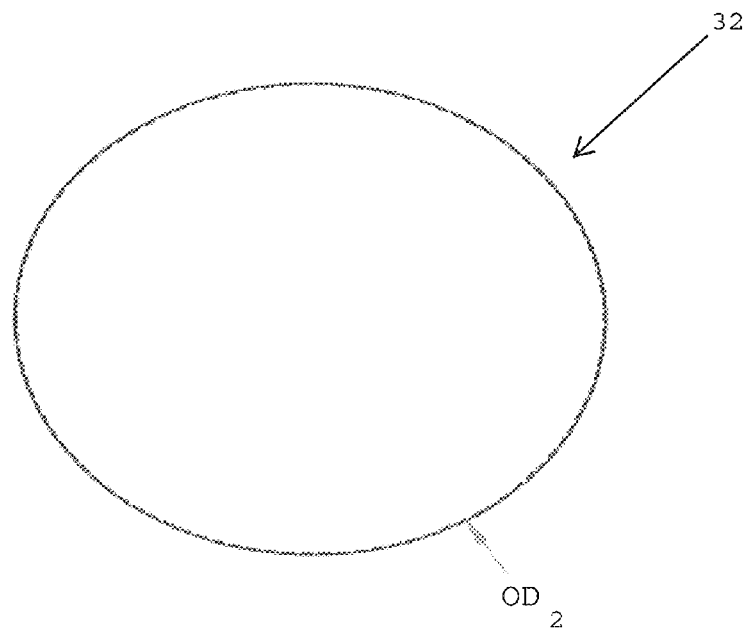
Figure 3C:
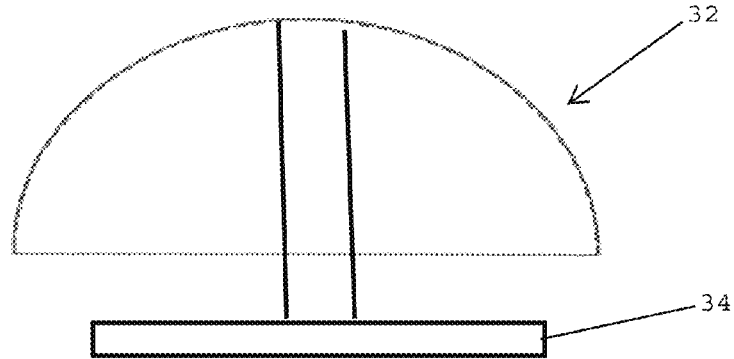

Referring to FIGS. 3A-3C, in one embodiment, the carbon capture unit preferably includes a top 32 (FIG. 1A) that covers the upper end of the shell 30 (FIG. 2A). The top 32 preferably has an outer diameter $OD_2$ of about 4,000 cm that matches the $OD_1$ of the shell 30 (FIG. 2C). Referring to FIG. 3C, in one embodiment, the top 32 contains the sparger 34 that introduces the raw beet juice at the top of the reaction chamber.

Figure 4A:
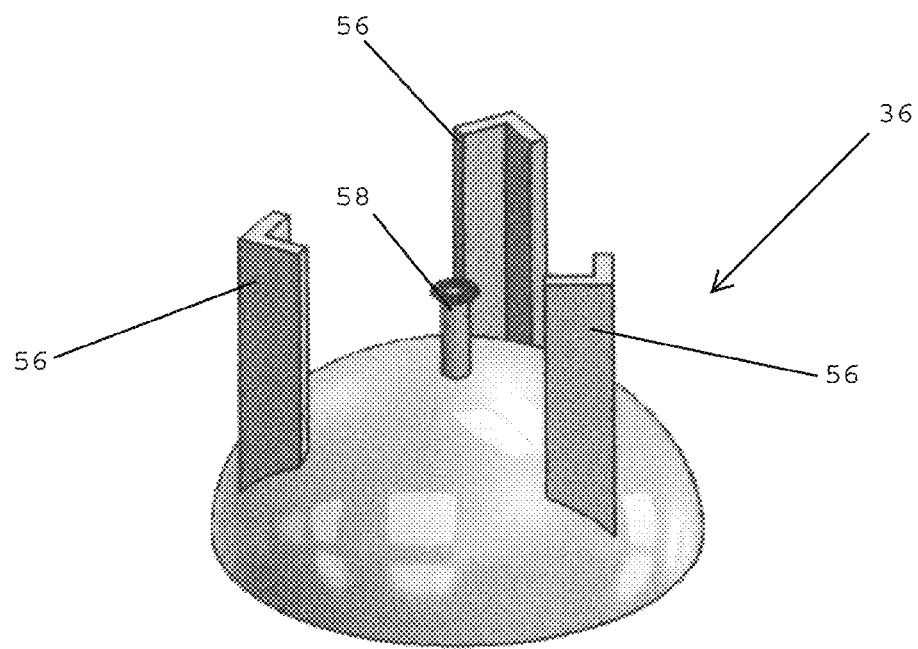
FIGS. 4A-4B show the bottom of the carbon capture unit shown in FIG. 1A.
Figure 4B:
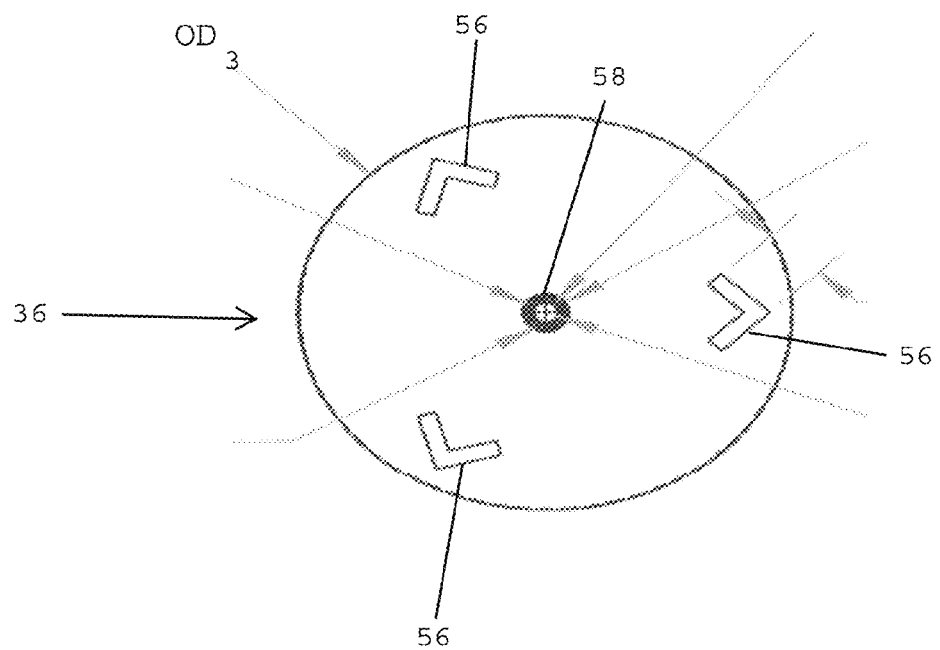
Figure 5A:
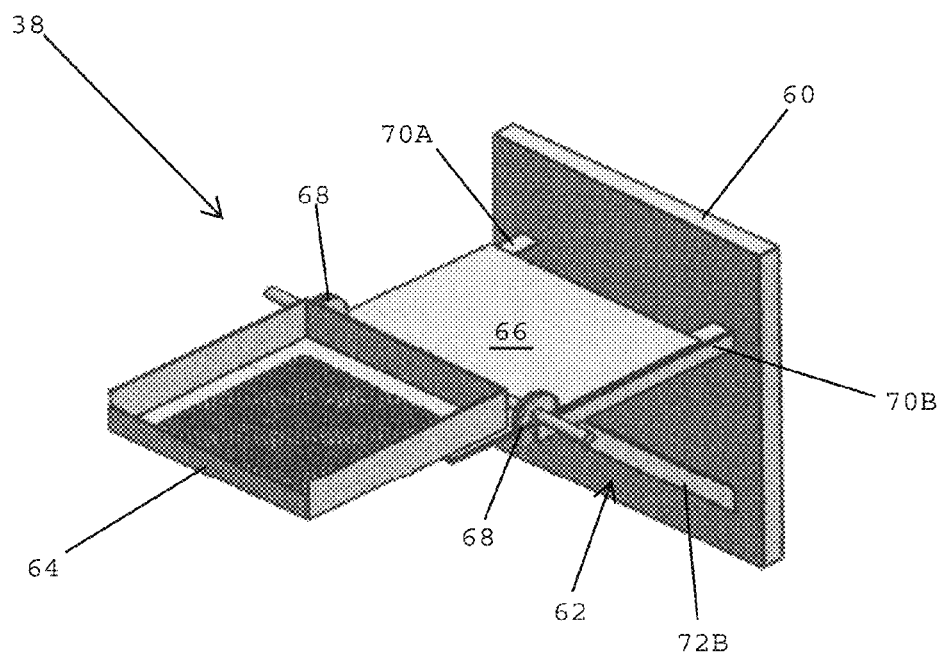
FIGS. 5A-5D show the tray assembly of the carbon capture unit shown in FIG. 1A.
Figure 5B:
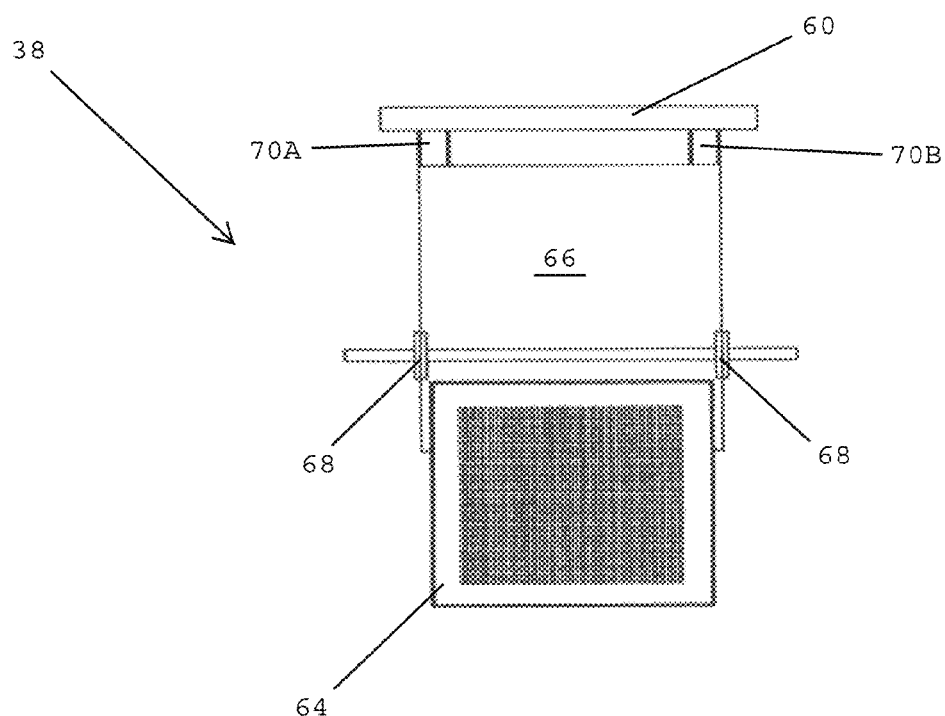
Figure 5C:
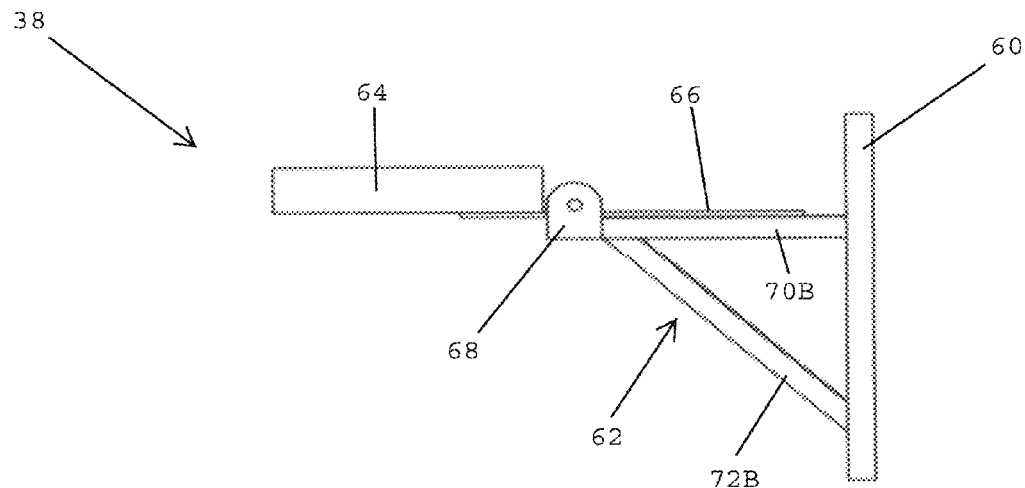
Figure 5D:
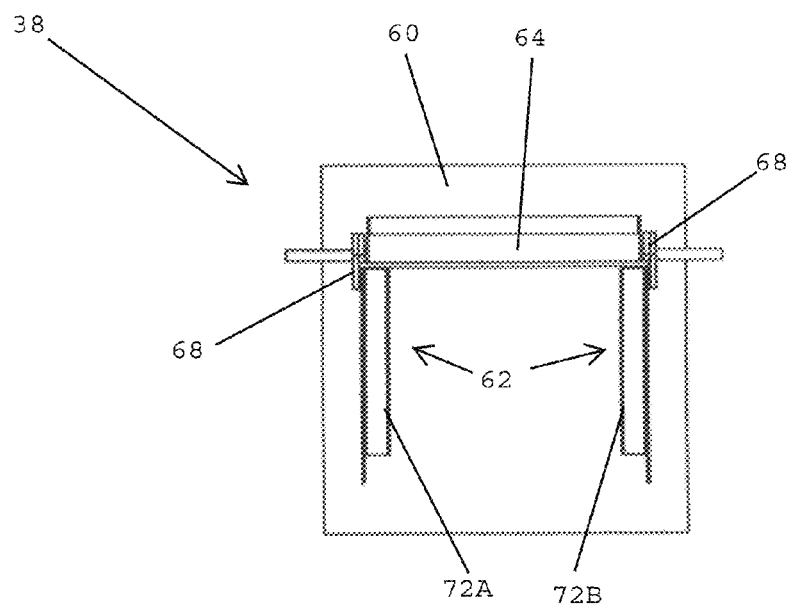

Referring to FIGS. 4A-4B, in one embodiment, the carbon capture unit preferably includes a bottom 36 (FIG. 1A) that covers the lower end of the shell 30 (FIG. 2A). In one embodiment, the bottom 36 has spaced legs 56 that support the bottom on a surface such as a floor. The bottom has a calcium carbonate sludge outlet 58 for removing calcium carbonate sludge from the reaction chamber through the bottom 36 of the carbon capture unit. Referring to FIG. 4B, in one embodiment, the bottom 36 has an outer diameter $OD_3$ of about 4,000 cm that matches the outer diameter $OD_1$ of the shell 30 (FIG. 2C) and the outer diameter $OD_2$ of the top 32.

Referring to FIGS. 5A-5D, in one embodiment, the carbon capture unit includes one or more tray assemblies 38 disposed inside the reaction chamber. In one embodiment, a tray assembly 38 preferably includes a mounting plate 60, a tray support frame 62 that extends inwardly from the mounting plate 60, a tray 64 coupled with a counterweight plate 66, and a pivot 68 that enables the tray to drop down when filled with a sufficient amount of calcium carbonate sludge to overcome the weight of the counterweight plate 66.

In one embodiment, the tray support frame 62 desirably includes a pair of horizontally extending support legs 70A, 70B and a pair of diagonally extending support legs 72A, 72B that connect together at the pivot 68. When the tray 64 is in the upright position shown in FIGS. 5A-5D, the horizontally extending support legs 70A, 70B function as a hard stop for the counterweight plate 66 to limit upward pivoting movement of the tray 64.

In one embodiment, during a reaction process, calcium carbonate sludge is collected on the tray 64. When the weight of the calcium carbonate sludge is greater than the weight of the counterweight plate 66, the tray 64, under the weight of the calcium carbonate sludge that it holds, will pivot down toward the bottom of the shell 30 (FIG. 1B). When the plate 64 pivots down, the plate will dump the calcium carbonate sludge that has been collected on the plate. Once the sludge has been dumped, the counterweight plate 66 will pivot the plate back to the upright position shown in FIGS. 5A-5D.

Referring to FIGS. 6A-6D, in one embodiment, the tray 64 preferably includes a tray bottom 74 having a plurality of holes 76 passing through the tray bottom. The plurality of holes 76 allow the raw juice to pass through the holes while the tray bottom 74 collects the calcium carbonate sludge. The tray 64 desirably has a rear wall 78, a front wall 80, a first side wall 82, and a second side wall 84. In one embodiment, the walls 78, 80, 82, 84 project upwardly from the tray bottom 74. The walls may be vertical walls. In one embodiment, the front wall 80 may be shorter than the rear wall 78 and the side walls 82, 84.

Figures 6A, 6B:
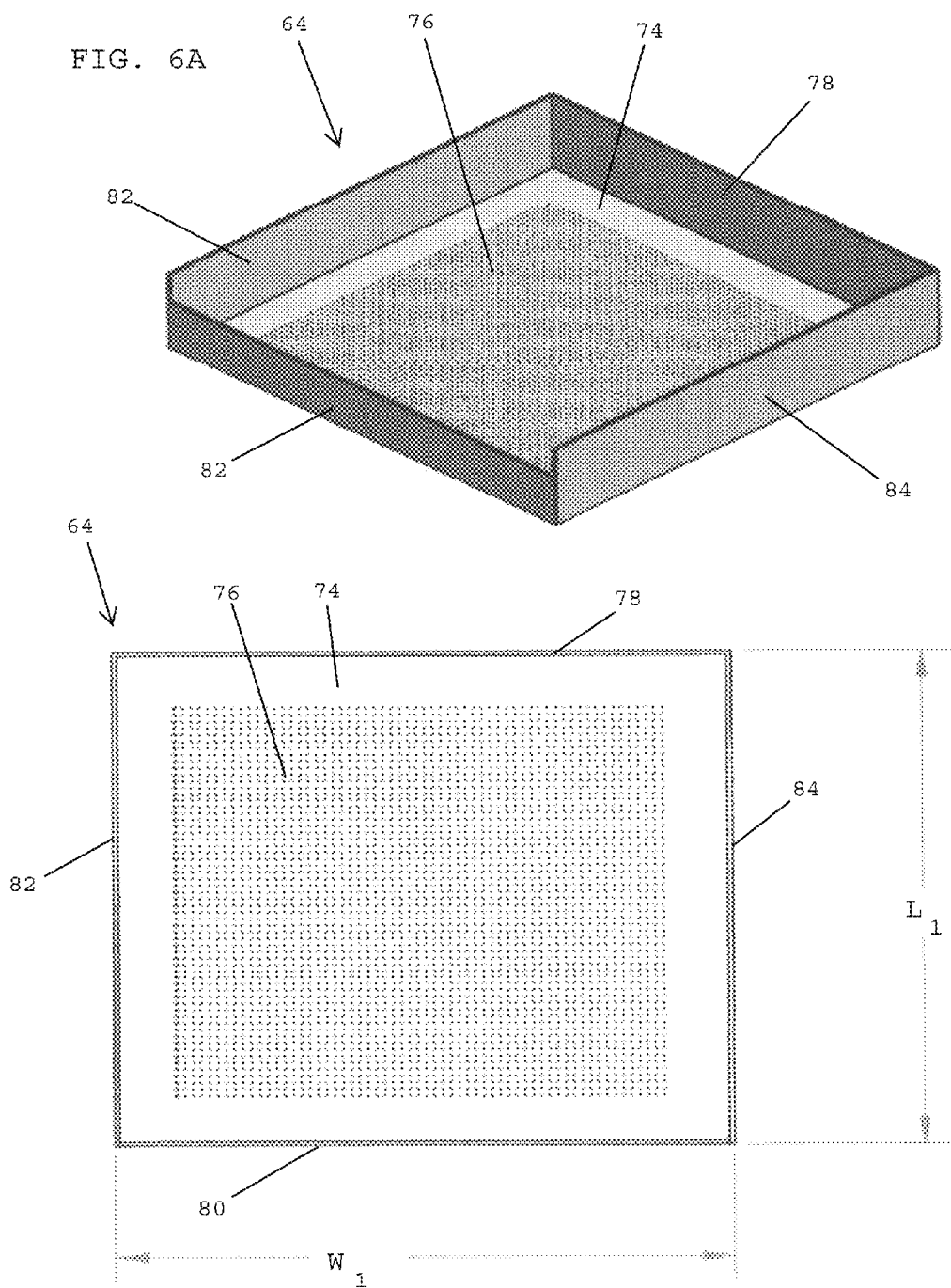
FIGS. 6A-6D show the tray of the tray assembly shown in FIGS. 5A-5D.

Referring to FIG. 6B, in one embodiment, the tray 64 has a length $L_1$ of about 750 cm, and a width $W_1$ of about 750 cm. In one embodiment, the plurality of holes 76 are evenly spaced from one another and cover most of the area of the tray bottom 74.

Figure 6C:
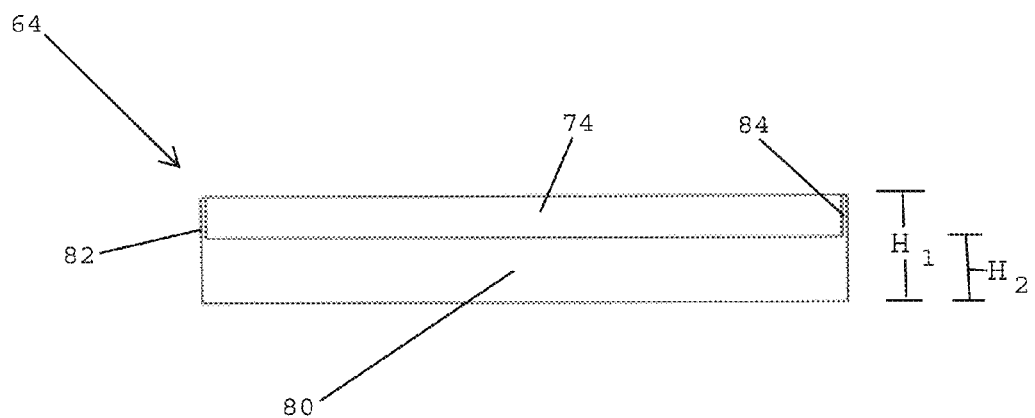
Figure 6D:
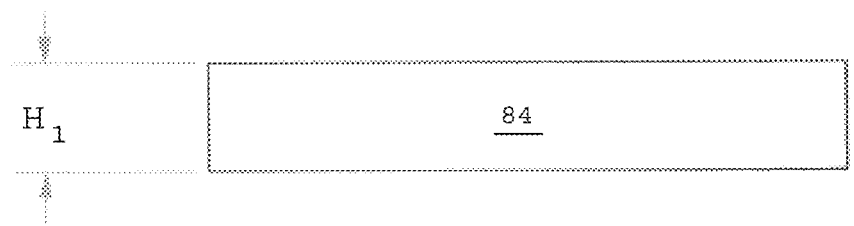

Referring to FIG. 6C, in one embodiment, the front wall 80 has a height $H_1$ of about 96 cm and the rear wall 74 and the side walls 82, 84 have a height $H_2$ of about 156 cm. Thus, in one embodiment, the front wall is 60 cm shorter than the rear and side walls.

Referring to FIGS. 7A-7D, in one embodiment, the carbon capture unit 28 (FIG. 1B) preferably includes a calcium carbonate sieve 40 that directs the dumped calcium carbonate sludge toward the calcium carbonate discharge port 58 (FIG. 4A) located in the bottom of the unit. In one embodiment, the sieve 40 desirably includes a rear wall 86, a sloping bottom 88, and a pair of opposing side walls 90, 92 that project upwardly from the sloping bottom wall and inwardly from the rear wall 86.

In one embodiment, the rear wall 86 is mounted to an inner surface of the shell 30 (FIG. 2C) with the sloping bottom 88 sloping away from the shell and toward the lower end of the shell. The sieve 40 is preferably adapted to direct the falling calcium carbonate sludge toward the center and bottom of the reaction chamber so that the sludge may be removed from the bottom of the carbon capture unit.

Figure 7A:
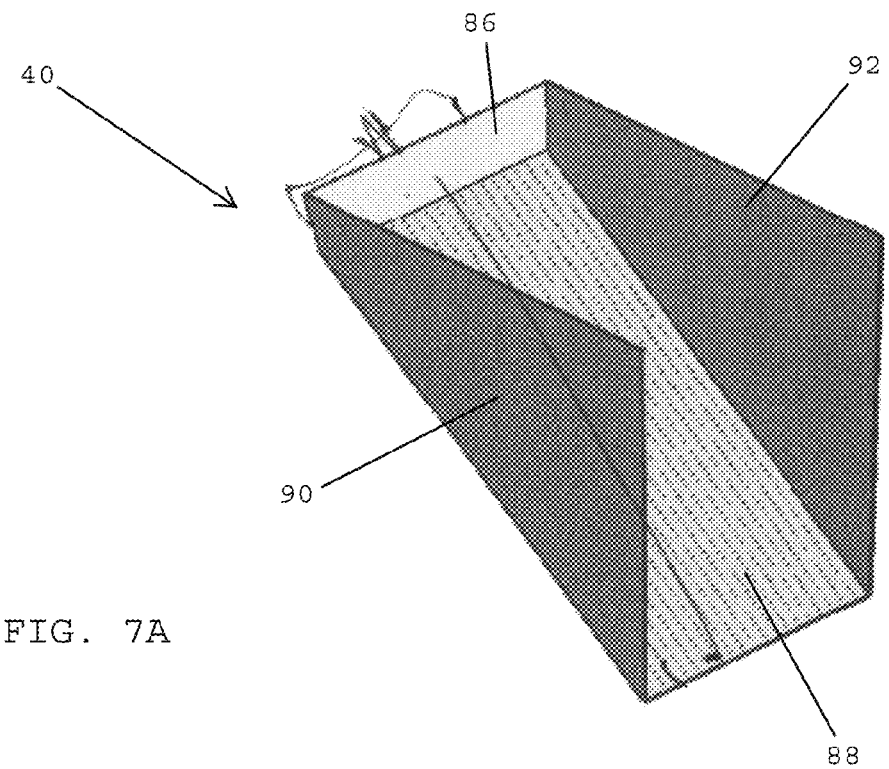
FIGS. 7A-7D show the calcium carbonate sieve of the carbon capture unit shown in FIG. 1A.
Figure 7B:
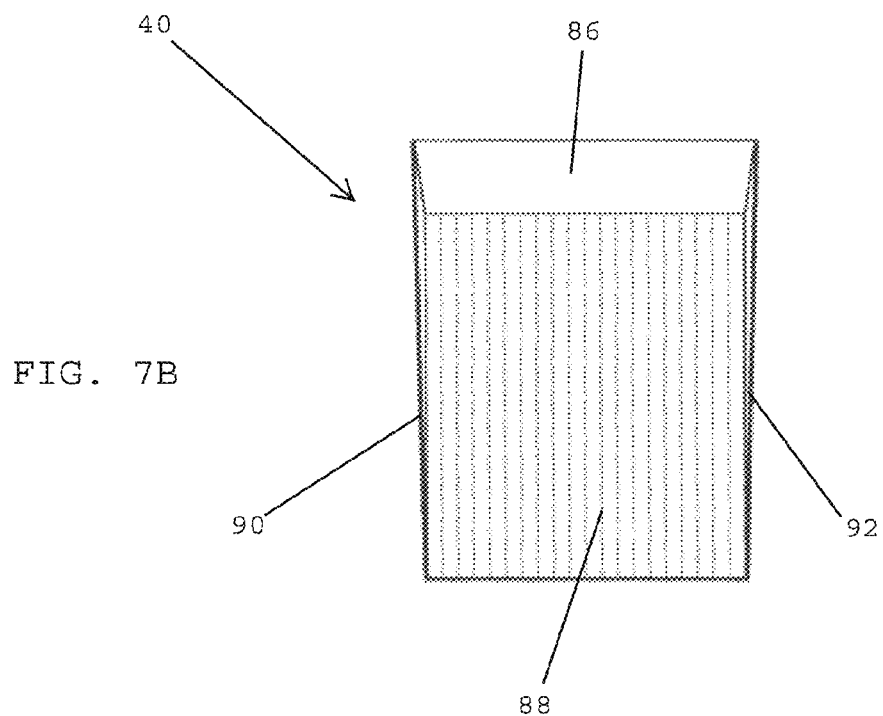
Figure 7C:
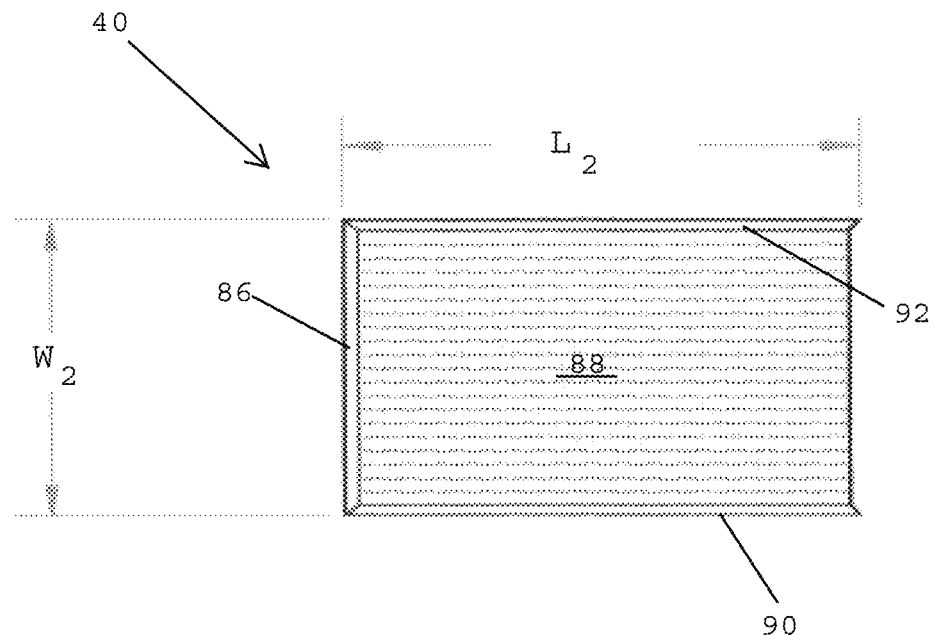

Referring to FIG. 7C, in one embodiment, the calcium carbonate sieve 40 has a length $L_2$ of about 4,400-4,500 cm and a width $W_2$ of about 3,200 cm.

Figure 7D:
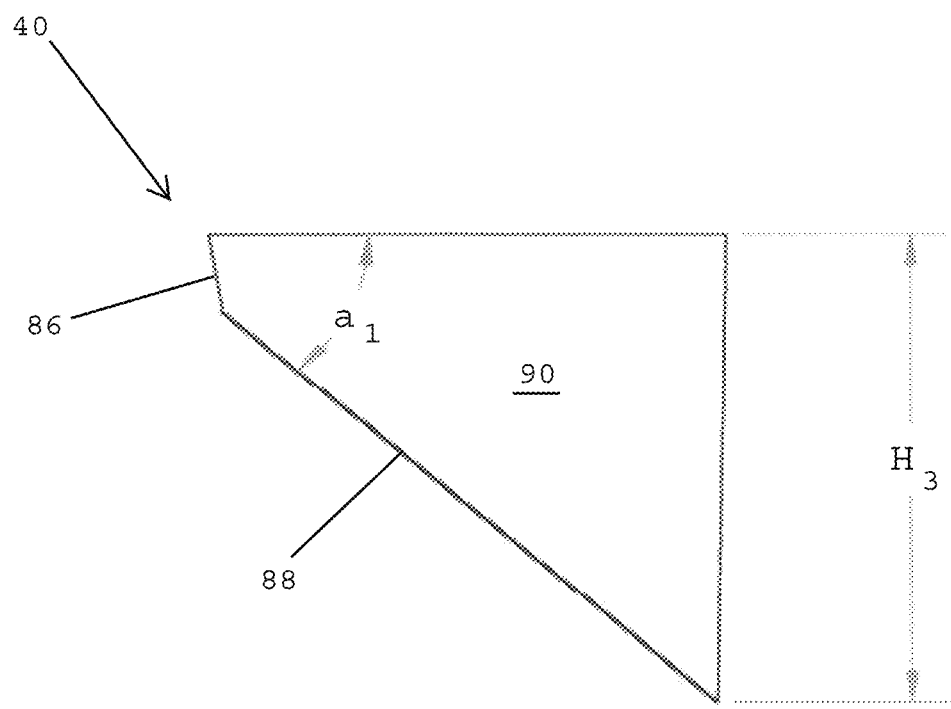

Referring to FIG. 7D, in one embodiment, the distance between the free end of the sloping bottom 88 and the upper edge of the side wall 90 defines a height H3 of about 5,000-5,100 cm. In one embodiment, the sloping bottom 88 and the upper edge of the side wall 90 define an angle $\alpha_1$ of about 45 degrees.

Figure 8:
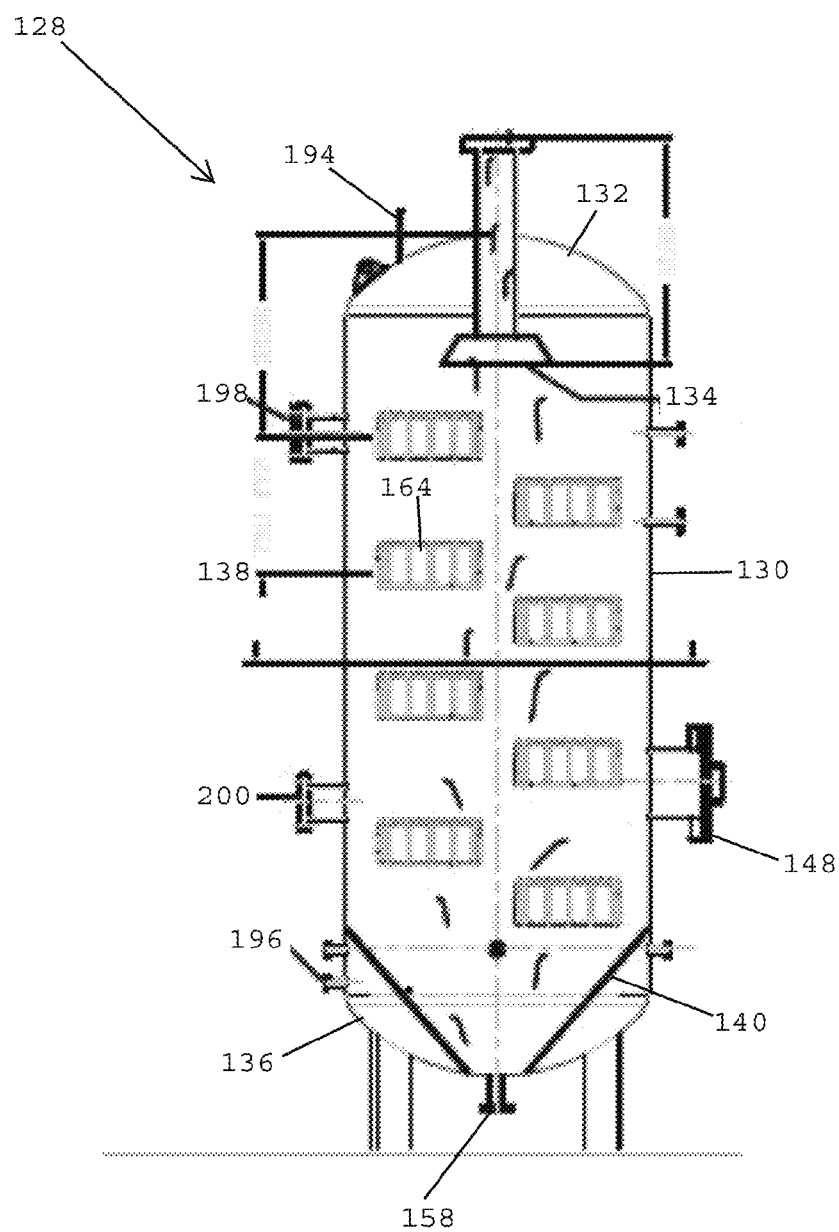
FIG. 8 shows a cross-sectional view of a carbon capture unit, in accordance with one embodiment of the present invention.

Referring to FIG. 8, in one embodiment, a carbon capture unit 128 has as its core unit a single reactor vessel 130, vertical in orientation, cylindrical in shape, with hemispherical dish ends 132, 136. An organic absorbent solution, such as raw beet juice, is brought from a storage container to the reactor 130 by gravitational feed. Inside the reactor 130 a sparger 134 is placed with suitably sized and configured nozzles that spray the organic fluid into the inner volume of the vessel 130.

Collection tray assemblies 138 with trays 164 having serrated edges are disposed within the reactor vessel 130. The descending fluid from the sparger 134 collects in the trays 164, and when this overflowing fluid passes over the serrated edges, they separate the overflowing fluid into sheet-like films. The bottom of the trays 164 have multiple small apertures which allow the fluid collected in each tray to again pour out of the tray from under the surface in the form of thin streams. When the weight of the precipitated calcium carbonate exceeds the weight of the counterweight plate coupled with the tray, the tray swivels and dumps the calcium carbonate toward the lower end of the reactor vessel 130. At the bottom, calcium carbonate sieves 140 receive the dumped calcium carbonate and via an outlet 158 discharges it into receiving equipment, which may be a conveyer belt or receiving bin.

Above the calcium carbonate sieves 140, one or more inlet nozzles 148 are arranged around the body of the shell 130. These inlet nozzles 140 connect to the pipe which will bring the exhaust gas stream containing the $CO_2$ from the boiler or any other source into the reactor. These nozzles 140 project inwardly to create an upward flow of the flue gas to create turbulent mixing with the descending fluid streams.

In one embodiment, one or more vents 194 are provided at the top of the unit 128 to allow for the escape of the remaining vented gases. The vented gases do not include carbon dioxide, which has been captured in the calcium carbonate sludge.

In one embodiment, at the bottom of the reactor chamber 130, a drain 196 is provided so that unreacted absorbent fluid can be collected and re-circulated back into the reactor vessel. Orifices 198, 200 for viewing, temperature measurement, gas flow measurement, pressure measurement, sampling tubes, etc. may be provided on the reactor vessel 130.

Figure 9A:
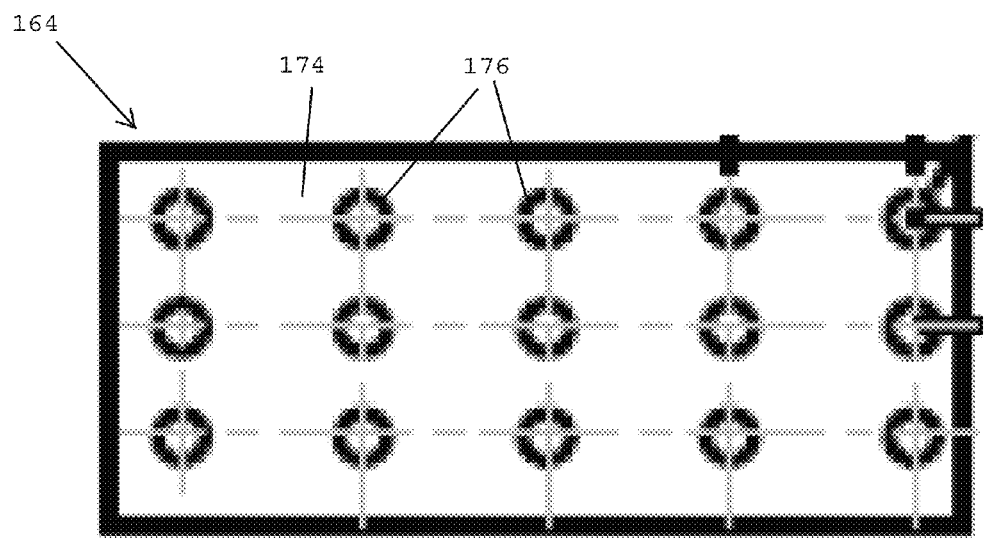
FIGS. 9A and 9B show a tray for a tray assembly of a carbon capture unit, in accordance with one embodiment of the present invention.
Figure 9B:
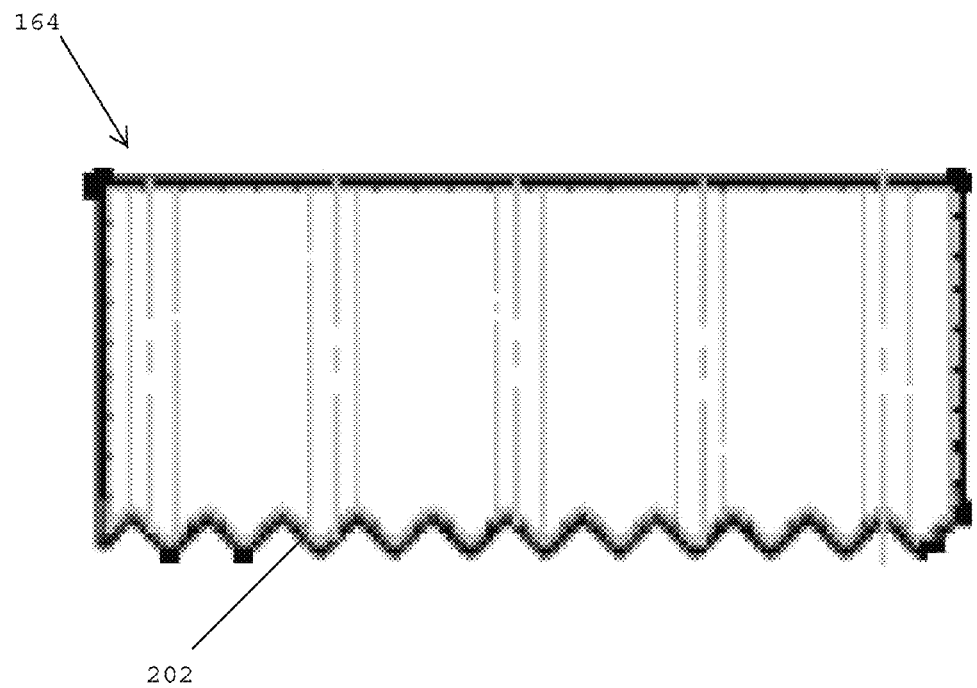

Referring to FIG. 9A, in one embodiment, the carbon capture unit preferably includes a pivoting or swiveling tray 164 having a tray bottom 174 with a plurality of small, spaced apertures 176. Referring to FIG. 9B, in one embodiment, the tray 164 has a serrated edge 202 at the inner edge of the tray bottom 174. In one embodiment, the overflowing fluid collected on the tray passes over the serrated edge 202, whereby the serrated edge separates the overflowing fluid into sheet-like films that flows down toward the bottom of the reaction chamber.

Although the present invention is not limited by any particular theory of operation, it is believed that using the $CO_2$ from power plants to clarify beet juice will result in an immense net reduction of $CO_2$ emissions as the $CO_2$ would not come from the combustion of fossil fuel as is being done in conventional sugar refineries. Rather, $CO_2$ would not have to be generated by sugar refineries for use in sugar refining processes, but may come from power plants by using the power plant flue gas as a source. Hence, the present invention provides a double savings of $CO_2$ emissions because the power plant's $CO_2$ emissions are used in the sugar refining process and the sugar refineries do not have to product $CO_2$.

Sugar refineries typically consume the same quantity of carbon dioxide as is emitted by a 100 MW coal fire power plant. Instead of the refineries producing $CO_2$ to do the carbonation, that is adding $CO_2$ which is expensive and created by a non-green process that uses fossil fuel in lime kilns, the $CO_2$ used for carbonating the raw juice is provided by the $CO_2$ emissions from a coal fired or natural gas power plant.

The present invention provides a number of benefits including: 1) the CCU combines the best of two individual approaches in scrubber technology, that of using calcium oxide (lime) as sorbent along with an organic renewable amine as liquid, and both these sorbents enhance each other; 2) the CCU has lower capital cost and complexity compared to existing scrubber technology because it creates useable byproducts; 3) the CCU byproducts of calcium carbonate, molasses, sugar, and ethanol have a market value, 4) Molasses has value for power plants as a supplemental fuel which is equal to tons of coal which saves money and reduces emissions; and 5) the raw material lime stone is usually already being procured by power plants for their SO2 scrubbers.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A method of capturing carbon dioxide emitted by a power plant comprising:
    providing a reactor vessel having a shell with a top and a bottom;
    introducing an exhaust gas stream into said reactor vessel via an exhaust gas inlet, said exhaust gas stream containing carbon dioxide, wherein said exhaust gas stream rises toward the top of said reactor vessel;
    introducing an organic sorbent solution into said reactor vessel at a location of said reactor vessel that is above said exhaust gas stream inlet so that said organic sorbent solution falls toward the bottom of said reactor vessel;
    mixing said rising exhaust gas stream with said falling organic sorbent solution to precipitate calcium carbonate;
    providing at least one tray assembly inside said reactor vessel, said at least one tray assembly comprising a pivoting tray;
    collecting said calcium carbonate on said pivoting tray; and
    removing said calcium carbonate from the bottom of said reactor vessel, wherein said calcium carbonate includes said carbon dioxide from said exhaust gas stream.

2. The method as claimed in claim 1, wherein said organic sorbent solution comprises raw sugar beet juice and lime milk.

3. The method as claimed in claim 2, wherein the mixing step includes deriving a sugar rich solution from said raw sugar beet juice.

4. The method as claimed in claim 3, further comprising separating said sugar rich solution from said calcium carbonate and removing said sugar rich solution from said reactor vessel.

5. The method as claimed in claim 4, further comprising removing moisture from said sugar rich solution to generate crystallized sugar.

6. The method as claimed in claim 1, further comprising after the mixing step, removing said exhaust gas stream from the top of said reactor vessel, wherein said exhaust gas stream removed from the top of said reactor vessel has less carbon dioxide than said exhaust gas stream introduced into said reactor vessel.

7. The method as claimed in claim 1, wherein the introducing said exhaust gas stream into said reactor vessel comprises:
    burning a fuel at a power plant to generate energy and said exhaust gas stream;
    using a conduit to connect said reactor vessel with said power plant; and
    directing said exhaust gas stream through said conduit and into said reactor vessel.

8. The method as claimed in claim 7, wherein said power plant is a coal fired power plant or a natural gas power plant.

9. The method as claimed in claim 1, wherein said pivoting tray comprises a tray bottom having a plurality of holes formed in said tray bottom, the method further comprising passing said organic sorbent solution through said plurality of holes in said tray bottom as said calcium carbonate is collected on said tray bottom.

10. The method as claimed in claim 9, wherein said at least one tray assembly further comprises a counterweight coupled with said pivoting tray, and a pivot that enables said pivoting tray to pivot from an upright position to a down position when the combined weight of said pivoting tray and said calcium carbonate collected on said pivoting tray is greater than the weight of said counterweight.

11. The method as claimed in claim 10, further comprising pivoting said pivoting tray from the upright position to the down position when the combined weight of said pivoting tray and said calcium carbonate collected on said pivoting tray is greater than the weight of said counterweight for dumping said calcium carbonate collected on said pivoting tray toward the bottom of said reactor vessel, and, after the dumping step, returning said pivoting tray to the upright position under the weight of said counterweight.

12. The method as claimed in claim 9, wherein said tray bottom has an inner edge that is serrated to separate said organic sorbent solution flowing over said serrated inner edge into sheet-like films that flow down toward the bottom of said reactor vessel.

13. The method as claimed in claim 1, wherein the step of providing at least one tray assembly inside said reactor vessel comprises providing a plurality of tray assemblies inside said reactor chamber, wherein said tray assemblies are spaced from one another between the top and the bottom of said shell of said reactor vessel.

14. A method of making sugar using carbon dioxide gas emitted by a power plant comprising:
    processing sugar beets to generate raw sugar beet juice;
    mixing said raw sugar beet juice with lime milk to product a sorbent solution;
    providing a reactor vessel having a shell with a top and a bottom;
    introducing an exhaust gas stream from a power plant into said reactor vessel via an exhaust gas inlet, said exhaust gas stream containing carbon dioxide, wherein said exhaust gas stream rises toward the top of said reactor vessel;
    introducing said sorbent solution containing said raw sugar beet juice and said lime milk into said reactor vessel at a location of said reactor vessel that is above said exhaust gas inlet so that said sorbent solution falls toward the bottom of said reactor vessel;
    mixing said rising exhaust gas stream with said falling sorbent solution to precipitate calcium carbonate that contains said carbon dioxide from said exhaust gas stream and a sugar rich solution derived from said raw sugar beet juice;

providing one or more tray assemblies inside said reactor vessel, each said tray assembly comprising a pivoting tray;

collecting said calcium carbonate on said pivoting trays;

separating said sugar rich solution from said calcium carbonate; and removing said calcium carbonate from the bottom of said reactor vessel.

15. The method as claimed in claim 14, further comprising removing moisture from said sugar rich solution to generate crystallized sugar.

16. The method as claimed in claim 14, further comprising after the mixing step, removing said exhaust gas stream from the top of said reactor vessel, wherein said exhaust gas stream removed from the top of said reactor vessel has less carbon dioxide than said exhaust gas stream introduced into said reactor vessel.

17. The method as claimed in claim 14, wherein the introducing said exhaust gas stream into said reactor vessel comprises:

burning a fuel at a power plant to generate energy and said exhaust gas stream;

using a conduit to connect said reactor vessel with said power plant; and directing said exhaust gas stream generated at said power plant through said conduit and into said reactor vessel.

18. The method as claimed in claim 17, wherein said power plant is a coal fired power plant or a natural gas power plant.

19. The method as claimed in claim 14, wherein said pivoting tray comprises a tray bottom having a plurality of holes formed in said tray bottom, the method further comprising allowing said organic sorbent solution to pass through said plurality of holes in said tray bottom as said calcium carbonate is collected on said tray bottom.

20. The method as claimed in claim 19, wherein said at least one tray assembly further comprises a counterweight coupled with said pivoting tray, and a pivot that enables said pivoting tray to pivot from an upright position to a down position when the combined weight of said pivoting tray and said calcium carbonate collected on said pivoting tray is greater than the weight of said counterweight.

21. The method as claimed in claim 20, further comprising pivoting said pivoting tray from the upright position to the down position when the combined weight of said pivoting tray and said calcium carbonate collected on said pivoting tray is greater than the weight of said counterweight for dumping said calcium carbonate collected on said pivoting tray toward the bottom of said reactor vessel, and, after the dumping step, returning said pivoting tray to the upright position under the weight of said counterweight.

22. The method as claimed in claim 21, wherein said tray bottom has an inner edge that is serrated to separate said organic sorbent solution flowing over said serrated inner edge into sheet-like films that flow down toward the bottom of said reactor vessel.

23. The method as claimed in claim 14, wherein the step of providing one or more tray assemblies inside said reactor vessel comprises providing a plurality of tray assemblies inside said reactor chamber, wherein said tray assemblies are spaced from one another between the top and the bottom of said shell of said reactor vessel.

\* \* \* \* \*